US006968336B1

(12) United States Patent
Gupta

(10) Patent No.: US 6,968,336 B1
(45) Date of Patent: Nov. 22, 2005

(54) METHOD FOR GENERATING, ORGANIZING TABLE CODES EITHER CODE IS HIGHEST CODE LEVEL OR CODE IS LINKED TO PARENT CODE IN HIERARCHICAL STRUCTURE

(75) Inventor: Deepak Gupta, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/574,090

(22) Filed: May 18, 2000

(51) Int. Cl.[7] ............................................. G06F 17/30
(52) U.S. Cl. ........................... 707/100; 707/1; 707/102
(58) Field of Search . 707/1–10, 100–104.1; 705/1–15, 705/25–28

(56) References Cited

U.S. PATENT DOCUMENTS

| | | | | |
|---|---|---|---|---|
| 5,164,897 A | * | 11/1992 | Clark et al. | 705/1 |
| 5,201,047 A | * | 4/1993 | Maki et al. | 707/4 |
| 5,777,876 A | * | 7/1998 | Beauchesne | 700/95 |
| 5,960,164 A | * | 9/1999 | Dorfman et al. | 358/1.11 |
| 5,974,407 A | * | 10/1999 | Sacks | 707/2 |
| 6,035,298 A | * | 3/2000 | McKearney | 707/10 |
| 6,154,738 A | * | 11/2000 | Call | 707/4 |
| 6,279,008 B1 | * | 8/2001 | Tung Ng et al. | 707/102 |
| 6,385,618 B1 | * | 5/2002 | Ng et al. | 707/103 Y |
| 6,510,433 B1 | * | 1/2003 | Sharp et al. | 707/100 |
| 6,516,326 B1 | * | 2/2003 | Goodrich et al. | 707/104.1 |
| 6,609,128 B1 | * | 8/2003 | Underwood | 707/10 |
| 6,711,593 B1 | * | 3/2004 | Gordon et al. | 707/204 |
| 6,754,666 B1 | * | 6/2004 | Brookler et al. | 707/102 |
| 6,789,195 B1 | * | 9/2004 | Prihoda et al. | 713/182 |
| 2003/0126139 A1 | * | 7/2003 | Lee et al. | 707/100 |

FOREIGN PATENT DOCUMENTS

EP 1071041 A2 * 1/2001 ...................... 5/40
EP 1324221 A2 * 7/2003 ..................... 17/30

OTHER PUBLICATIONS

U.S. Appl. No. 60/149,855, filed on Aug. 19, 1999.*
Economic Census 1997 "New classification system Debuts in 1997 economic census" two pages.*
SIC & NAICS codes, Jackson Library, UNC-Greensboro, updated Nov. 12, 2004, 3 pages.*
Heather Hedden, NAICS codes: A new Industry classification system, 5 pages.*
Exitsinc.com Smart Software for Exporters Global Wizard, 20, pages.*
US Census Bureau, Database and directory publishers, 1997 Economic Census Manufacturing Industry Series, 1997 issued Nov. 1999.*
exitsinc.com, Global Wizard, smart software for exporters, no date, 20 pages.*
TAA/NAFTA-TAA General Coding Instructions, Attachment to GAL 5-98, Change 1, no. date, 12 pages.*
WiiW, "wiiw Industrial database eastern europe", Jul. 2004, 8 pages.*
Paul T Zeisset et al. US Census Bureau, "how NAICS will affect data users", revised: Feb. 23, 1998, 15 pages.*

* cited by examiner

*Primary Examiner*—Srirama Channavajjala
(74) *Attorney, Agent, or Firm*—Schmeiser, Olsen & Watts; William H. Steinberg

(57) ABSTRACT

A business method for converting and storing classification data of existing codes having different number of levels and different number of digits in each level in their hierarchal structure. The invention comprises converting the existing codes in an integrated manner to a tabular format, containing the description of existing codes, level of codes and links to the parent codes by a converting means and storing the said tabular format in the said data storage means, such that it is accessible by a common access means.

20 Claims, 3 Drawing Sheets

METHOD FOR GENERATING, ORGANIZING TABLE CODES EITHER CODE IS HIGHEST CODE LEVEL OR CODE IS LINKED TO PARENT CODE IN HIERARCHICAL STRUCTURE

This invention relates to a method for converting and storing classification data of existing codes having different numbers of levels and different number of digits in each level in their hierarchial structure.

BACKGROUND OF THE INVENTION

The world is fast moving towards computerization and the current wave in IT is e-commerce. With all companies and business houses vying for a domain in the cyber world, the e-business applications are becoming more and more popular. A majority of these applications are business to business (B2B) in nature where buyers and sellers negotiate trade over the electronic media. A major problem faced in such cases is of cataloging the products and providing some universal method of categorizing them. The products are generally identified using product identification number and are classified in a hierarchial structure using codes. These are generally numeric codes, with different predefined levels used to classify things.

For example a hypothetical 3 digit 3 level code would look like:
1 0 0 Agriculture, hunting and related service activities
1 1 0 Growing of crops; market gardening; horticulture
1 1 1 Growing of cereals and other crops
1 1 2 Growing of vegetables, horticulture specialties and nursery products
1 1 3 Growing of fruits, nuts, beverage and spice crops
1 1 4 Growing of decorative plants
1 2 0 Farming of animals
1 2 1 Farming of cattle, dairy farming
1 2 2 Farming of sheep, goats, horses, asses and mules
1 2 3 Farming of swine
2 0 0 Mining
2 1 0 Oil and gas extraction
2 1 1 Crude petroleum and Natural Gas Extraction
2 1 2 Natural Gas Liquid Extraction
2 1 3 Mining (except oil and gas)
2 2 0 Coal Mining
2 2 1 Bituminous Coal and lignite surface mining
2 2 2 Bituminous Coal underground mining
2 2 3 Anthracite Mining Currently, there are a variety of codes available on the internet that classify products and services which can be used by applications:—Harmonic, NACE, NAFTA are a few popular ones. However, there is no code, which is exhaustive and completely covers all domains of services and products. One caters to services, the other to products, one caters to the IT industry, another to manufacturing. For example, the Harmonic code, which is the most widely used code (used majority of applications and by trade opportunities sites) does not have the product category 'Computer' in it. Probably when it was created, computers were not popular.

Forming new codes is an option but customers are already used to some universal codes and refrain from using a new set of codes. This approach also prevents integration of such applications with other existing applications and with those of business partners. It also leads to confusion amongst the buyers and sellers.

The above scenario necessitates the use of more than one of the available codes and the ability to use or choose from any of them. This presents the following problems:
- codes differ from each other so much that it is not possible to define common template for all of them in the current form.
- the number of digits in the codes are different. For example, Harmonic Codes are 6 digit codes, NACE are 4 digit and NAFTA/NAICE are 6 digit ones.
- the number of levels in the hierarchy of codes vary. For example, Harmonic Codes have 3 levels, NACE have 3 levels and NAICE/NAFTA have 5 levels.
- the number of digits in each level vary. For example in Harmonic Codes each level is 2 digits, in others it is not.
- the number of digits in different levels of the same codes vary. For example in NACE codes, first level is 2 digits, while the second and third are 1 digit each. Similarly, in NAICE/NAFTA codes the first level is 2 digits and the next 4 levels are 1 digit each. So the Harmonic codes are 6 digit 3 level {2,2,2}, NACE codes are 4 digit 3 level codes {2,1,1}, NAFTA codes are 6 digit 5 level codes {2,1,1,1,1}.

These problems drive the need for a generalized method to implement all codes, without difficulty and minimum effort for implementing applications over them. The method should be valid for any code and every code, for one code and any number of codes, together as well as separately.

The object of this invention is to provide a simple and effective system for enabling the storage and use of diverse classification systems in an integrated manner. The invention further not only caters to Product codes but can be used in any application where objects need to be classified in a hierarchy, for example, file systems, computer trees, users and user groups, industry segments.

SUMMARY OF THE INVENTION

Figure 1:
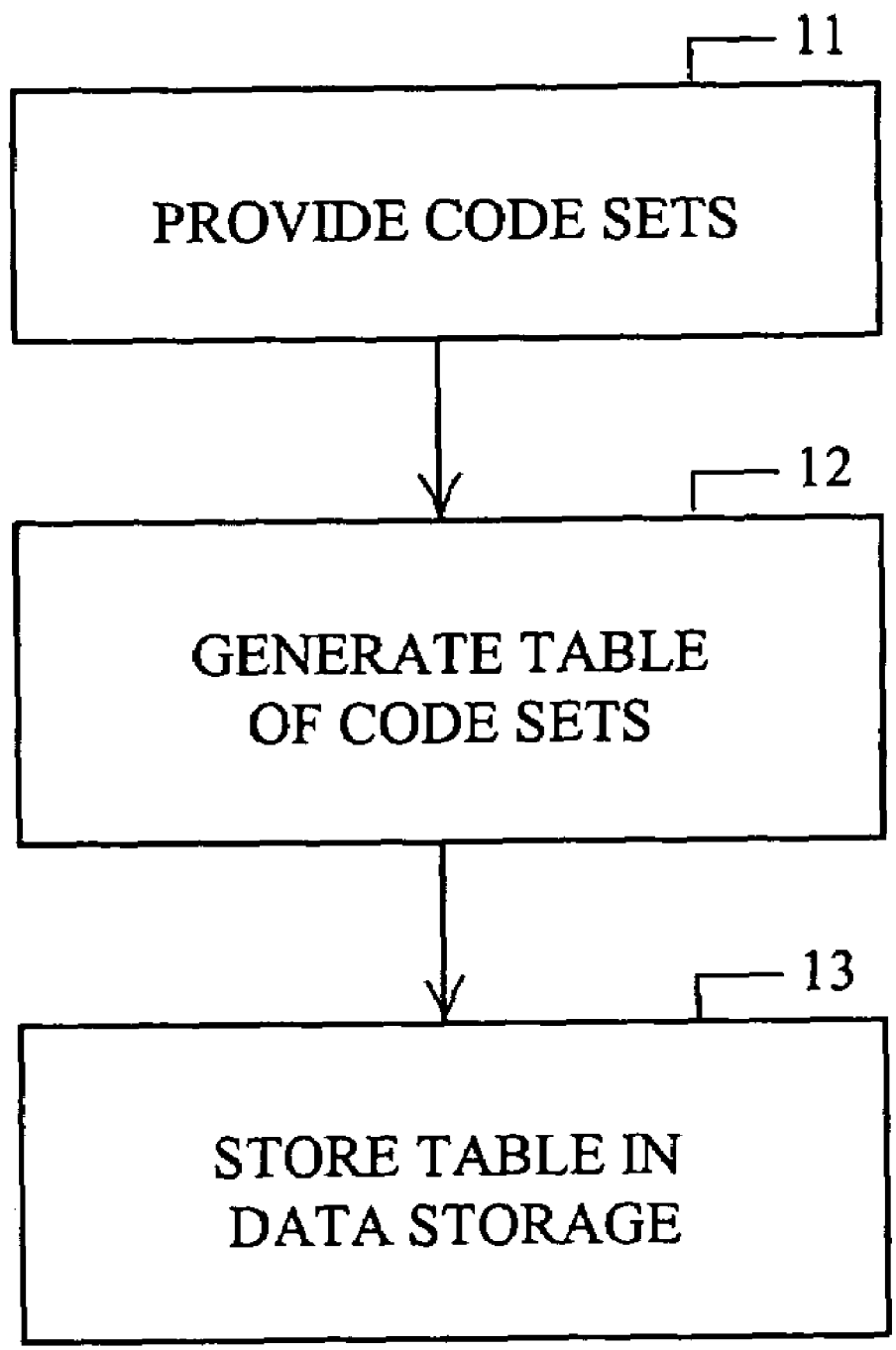
FIG. 1 is a flow chart depicting a method of generating and storing a table of code sets, in accordance with embodiments of the present invention.

To achieve the said objective this invention provides in a computing system consisting of a central processing unit with associated memory, input output devices and data storage means, a method for converting and storing classification data of existing codes having different numbers of levels and different number of digits in each level in their hierarchial structure, comprising converting the said existing codes in an integrated manner to a tabular format containing the description of existing codes, level of each code and link to the parent code, by a converting means and storing the said tabular format in the said data storage means, such that it is accessible by a common access means.

The said format contains the said existing codes such that the end user is able to see the existing code. The said format is compatible to all codes such that conversion to this format from any existing code is smooth and simple.

The said format has the following fields:

| | | |
|---|---|---|
| 1. tbl_srl_no | : | Serial number of the code ÿrial number of the code Running number ÿunning number PRIMARY KEY : |
| 2. tbl_code | : | Actual Code from the original Code List : |
| 3. tbl_up_srl_no | : | Serial Number of the parent Code, *if highest level of the code : |
| 4. tbl_level | : | Level of the code : |
| 5. tbl_description | : | Description of the product/Service from the original code list : |
| 6. tbl_code_type | : | Type of the code (Harmonic, NACE/NAFTA etc) : |
| 7. Tbl_last_lvl | : | Whether it is the last level or not : |

The said fields and their sizes are based on the application requirement.

In a specific embodiment the said format has the following fields:

| | | |
|---|---|---|
| 1. tbl_srl_no | : | Serial number of the code ÿrial number of the code Running number ÿunning number PRIMARY KEY : |
| INTEGER | | |
| 2. tbl_code | : | Actual Code from the original Code List : |
| CHAR(10) | | |
| 3. tbl_up_srl_no | : | Serial Number of the parent Code, *if highest of the level code : |
| INTEGER | | |
| 4. tbl_level | : | Level of the code : |
| INTEGER | | |
| 5. tbl_description | : | Description of the product/Service from the original code list : |
| VARCHAR(500) | | |
| 6. tbl_code type | : | Type of the code (Harmonic, NACE/NAFTA etc) : |
| CHAR(1) | | |
| 7. tbl_last_lvl | : | Whether it is the last level or not : |
| CHAR(1) {1/0} | | |

All the existing codes and new codes are identified by the serial number, which is a running number.

The original code and the description are stored as it is for display to the end user in the application.

All codes have the serial number of their parent code along with the level of the code in the heirarchy.

The said existing codes include the widely used Harmonic, NACE, NAICE/NAFTA codes.

New codes are added to the system as and when they are generated.

The said converting means is a software programme means. The said software programme is in any computer programming language such as Java, C, C++.

The said computing system is a part of a communication network.

The said communication network is the internet.

In the instant invention, as many codes as desired may be added one after the other.

All the codes are identified by the serial number (primary key of the table), which is a running number (tbl_srl_no). This can be used to identify all products within the application. This would be the index to all searches and postings and other activities on any system. The original code (tbl_code) and the description (tbl_description) are stored as it is from the original codes list. These will be used for display to the end user in the application. The type of code is stored against each code (tbl_code_type).

All codes also have the serial number of parent code i.e. of one level above them (tbl_up_srl_no). The hierarchy level of the code (tbl_level) is also stored, as well as the status indicating whether or not it is the last level (tbl_last_lvl).

Using the above, it is very simple to incorporate any code of any kind (with different lengths, with different levels and having different number of digits to indicate levels).

The serial number is used to identify codes and also can be used as the product identification number or there may be a table relating product identification with the serial number.

For example the hypothetical code mentioned above would look like:

1 | 100 | * | 1 | Agriculture, hunting and related service activities |G|0
2 | 110 | 1 | 2 | Growing of Crops; market gardening; horticulture |G|0
3 | 111 | 2 | 3 | Growing of cereals and other crops n.e.c. |G|1
4 | 112 | 2 | 3 | Growing of vegetables, horticulture specialties and nursery products |G|1
5 | 113 | 2 | 3 | Growing of fruit, nuts, beverage and spice crops |G|1
6 | 114 | 2 | 3 | Growing of decorative plants |G|1
7 | 120 | 1 | 2 | Farming of animals |G|0
8 | 121 | 7 | 3 | Farming of cattle, dairy farming |G|1
9 | 122 | 7 | 3 | Farming of sheep, goats, horses, asses, mules and hinnies |G|1
10 | 123 | 7 | 3 | Farming of swine |G|1
11 | 200 | * | 1 | Mining |G|0
12 | 210 | 11 | 2 | Oil and gas extraction |G|0
13 | 211 | 12 | 3 | Crude Petroleum and natural gas extraction |G|1
14 | 212 | 12 | 3 | Natural gas liquid Extraction |G|1
15 | 212 | 12 | 3 | Mining (except Oil and Gas) |G|1
16 | 220 | 11 | 2 | Coal Mining |G|0
17 | 221 | 16 | 3 | Bituminous Coal and Lignite Surface Mining |G|1
18 | 222 | 16 | 3 | Bituminous Coal Underground Mining |G|1
19 | 223 | 16 | 3 | Anthracite Mining |G|1

Where '|' is the separator used to separate different columns in a row, ÿn a row, Gÿn a row, is used for the code type.

Where '|' is the separator used to separate different columns in a row, ÿn a row, Gÿn a row, is used for the code type.

For moving through the hierarchy of any code, simple traversal is also possible. For example in a simple buyer-seller application, the products will be shown as

| First Page: (optional) | select * from table_name where tbl_level = 1 and tbl_code_type = code_type |
|---|---|

This will have a link to the Next page passing the serialnumber as parameter
Subsequent Pages select *from table_namewhere tbl_up_srl_no=serialnumber
where serialnumber is the one passed from the previous page.
If the tbl_last_lvl is 0, it will have a similar link again, else it is the final level.

The only problem now remains is how to put the data files (containing the codes) into this table. This can be done by incorporating a simple conversion programme which includes text parsing means.

For example, the hypothetical code assumed above will be like
100 Agriculture, hunting and related service activities
110 Growing of Crops; market gardening; horticulture
111 Growing of cereals and other crops n.e.c.
112 Growing of vegetables, horticulture specialties and nursery products
113 Growing of fruit, nuts, beverage and spice crops
114 Growing of decorative plants
120 Farming of animals
121 Farming of cattle, dairy farming
122 Farming of sheep, goats, horses, asses, mules and hinnies
123 Farming of swine
200 Mining
210 Oil and gas extraction
211 Crude Petroleum and natural gas extraction
212 Natural gas liquid Extraction
212 Mining (except Oil and Gas)
220 Coal Mining
221 Bituminous Coal and Lignite Surface Mining
222 Bituminous Coal Underground Mining
223 Anthracite Mining The conversion program written in any suitable language, say Java, reads the input file containing the existing codes and converts it to an output file in the required table format based on specified parameters defining the code structure i.e. code identifier, number of levels, number of digits in each level and a specified starting serial number of the output table, for example,
Java insertCode inputfilename outputfilename codetype startserialnumber levels Where

| | |
|---|---|
| Inputfilename | : Name of the input file. (The format of this file expected is Code, Code description) |
| Outputfilename | : Name of the output file |
| Codetype | : Type of code. (one char) example: H for Harmonic, |
| Startserialnumber | : Starting point of the serial number. You may want to have it as 1 for the first code being imported in to the table. And 1 + totalcodes_in_previous_codes_imported in the subsequent ones |
| Levels | : Levels in the code example:  2 2 2 for Harmonic<br>2 1 1 for NACE<br>2 1 1 1 1 for NAFTA |

So for the hypothetical example assumed above, we can say
java insertCode hyp.txt hypout.txt G1111
In the above it is assumed that all codes not at the lowest level have 0 s at the digits for the place to fill the blanks as is the case with all the standard codes. This can however be changed with simple modification in the Java file. Application builders can write their own text parsers as well with the same logic used.

Note: The codes which do not go down to the bottom of the hierarchy are not treated as the last level. For example, if a Harmonic code 99 99 00 does not have any children it will not be treated as the last level.

If it is desired to have all levels that do not have children to be treated as the last level, the same can be done with the simple SQL query after import
Update table_name set tbl_last_lvl=1 where tbl_srl_no not in (select tbl_up_srl_no from table_name)

A typical example of an application using this method would be:

A company that allows posting of trade opportunities on the net wants to tie up with another (share Opportunities Database so that their users get a broader market on the Net). Now as we saw different companies use different codes. Company 'A' may use Harmonic Codes and company 'B' may use 2 level 4 digit codes. Integrating would be impossible and the only technique left would be to put these codes in the description of the opportunity. If, however, the mechanism proposed is followed it would be very simple to integrate the two sites and provide an effective method to post/search opportunities.

This design provides access to all and any codes in the same manner and while building applications over this design it provides the following advantages:
1. Use of any code by simply putting it in the required format irrespective of the number of levels, digits etc.
2. Use of any number of codes together in an application.
3. Use of any combination of codes.
4. Addition of new codes whenever required.
5. A uniform way to address all codes, thereby providing a simple means to build applications.
6. A familiar and unchanged view of existing codes for the end user.
7. A simple method of identifying products without the need of a separate Product identification means.

Further, this invention caters not only to products and to the B2B e-commerce application but is universal and can be used anywhere where classification is required.

FIG. 1 is a flow chart depicting a method of generating and storing a table of code sets, in accordance with embodiments of the present invention. The method depicted in FIG. 1 comprises steps 11, 12, and 13.

Step 11 provides a plurality of code sets. Each code set is characterized by a code type, such as a Harmonic code type, a NACE code type, and a NAICE/NAFTA code type, etc.

Each code set comprises a plurality of codes organized according to a hierarchal structure in which each code is at a code level of the hierarchal structure, as described supra. Either the code level of the code is a highest code level or the code is linked to a parent code, as described supra.

Figure 2:
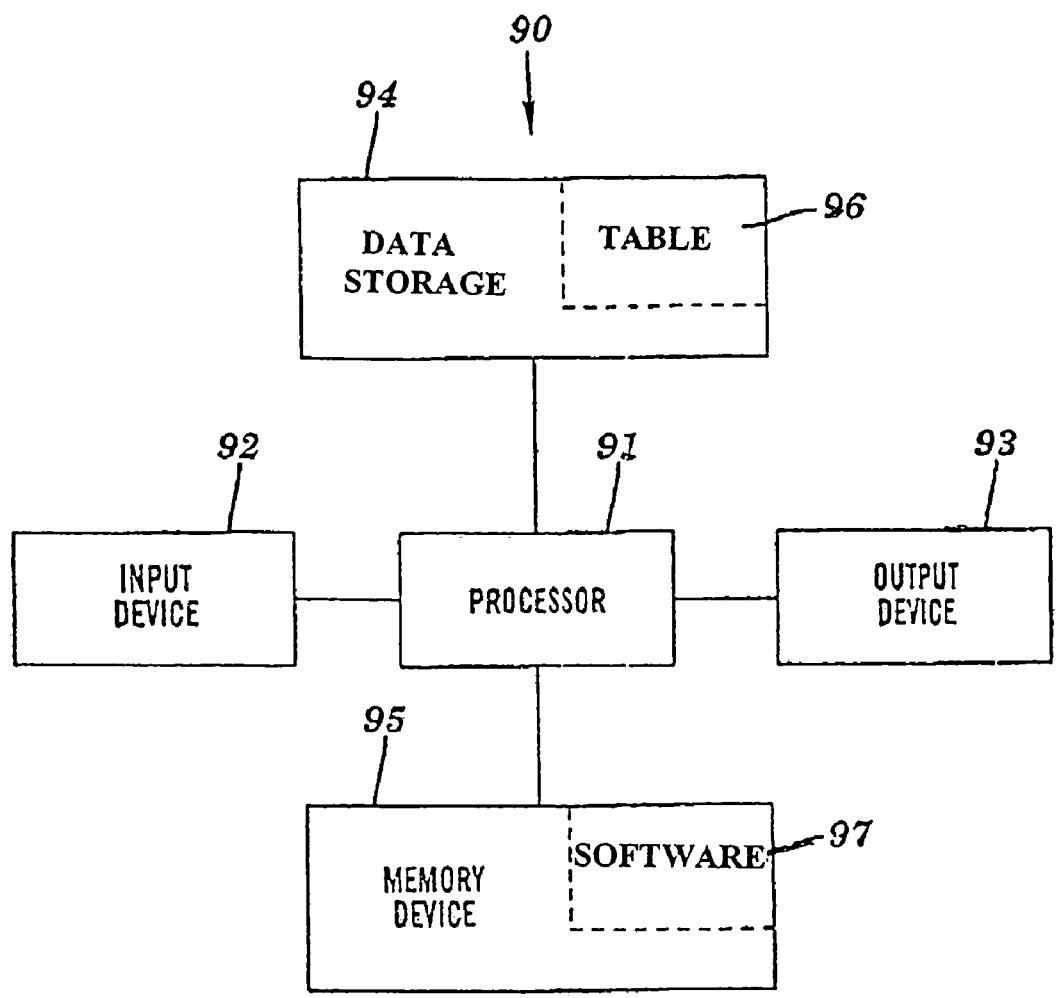
FIG. 2 is a computer system for generating and storing a table of code sets, in accordance with embodiments of the present invention.

Step 12 generates the table and step 13 stores the generated table in a data storage of a computing system, such as the computer system depicted in FIG. 2, described infra. The table comprises the code sets in accordance with a tabular format characterized by fields and a rows, as described supra. Each row representing a code of the plurality of codes of a code set, as described supra. The fields may comprise a tbl_sri field, a tbl_code field, a tbl_up_srl_no field, a tbl_level field, a tbl_description field, a tbl_code_type field, and a Tbl_lasst_lvl field code, as described supra. The generating step 12 includes converting classification data of existing codes having different numbers of levels and different number of digits in each level in their hierarchal structure.

FIG. 2 is a computer system 90 for generating and storing a table 96 of code sets, in accordance with embodiments of the present invention. The computer system 90 comprises a processor 91, an input device 92 coupled to the processor 91, an output device 93 coupled to the processor 91, a memory devices 95 coupled to the processor 91, and a data storage 94 coupled to the processor 91. The memory device 95 includes software 97. The processor 91 executes the software 97. The software 97 may be coded in a computer programming language such as Java, C, C++, etc.

The software 97 may comprise computer code that: generates the table 96; stores the generated table 96 in the data storage 94; and reads data from the table 96 stored in the data storage 94 (e.g., the "select" statement illustrated supra).

The software 97 may additionally or alternatively comprise computer code that: converts the existing codes in an integrated manner to a tabular format, containing the description of existing codes, level of codes and links to the parent codes by a converting means; and stores the tabular format in the data storage means, such that it is accessible by a common access means.

Figure 3:
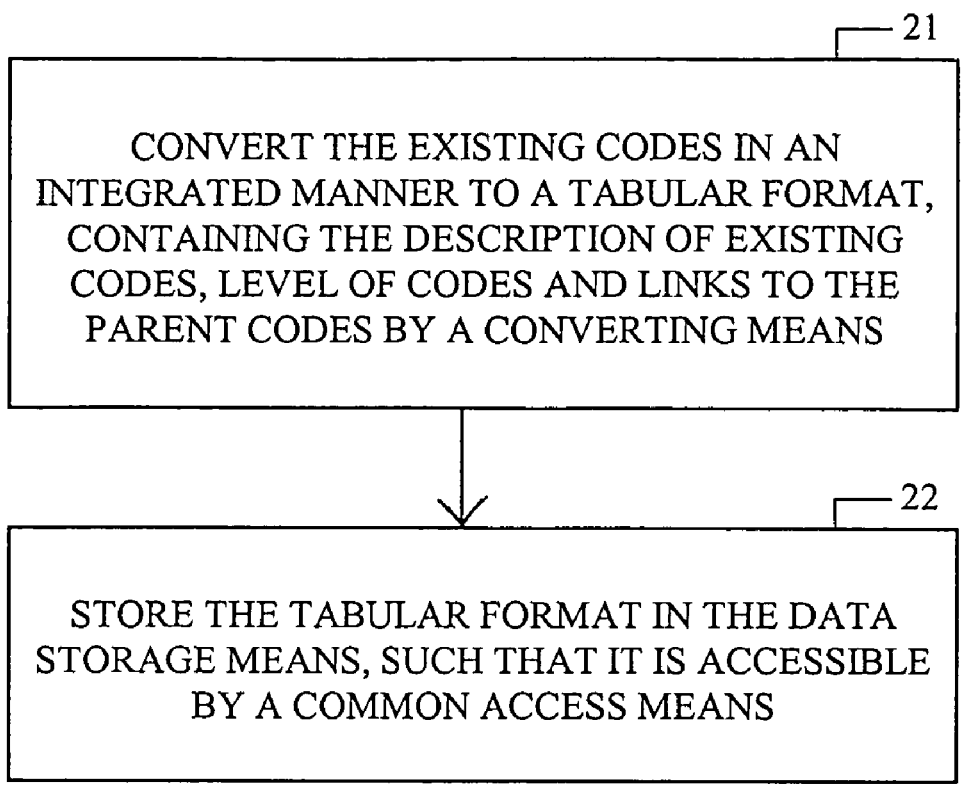
FIG. 3 is a flow chart depicting a method for converting and storing classification data of existing codes having different numbers of levels and different number of digits in each level in their hierarchal structure sets, in accordance with embodiments of the present invention.

FIG. 3 is a flow chart depicting a method for converting and storing classification data of existing codes having different numbers of levels and different number of digits in each level in their hierarchal structure sets, in accordance with embodiments of the present invention. The method depicted in FIG. 1 comprises steps 21 and 22.

Step 21 converts the existing codes in an integrated manner to a tabular format, containing the description of existing codes, level of codes and links to the parent codes by a converting means.

Step 22 stores the tabular format in the data storage means, such that it is accessible by a common access means.

What is claimed is:

1. A method for generating a table of codes, comprising:
providing a plurality of code sets, each code set being characterized by a code type, each code set comprising a plurality of codes organized according to a hierarchal structure in which each code is at a code level of the hierarchal structure and either the code level of the code is a highest code level or the code is linked to a parent code; and
generating said table and storing said generated table in a data storage of a computing system, said computing system comprising a processor, said generating and storing being performed by executing software by said processor, said processor being adapted to execute software code that reads data from said table stored in said data storage, said table comprising said code sets in accordance with a tabular format characterized by a plurality of fields and a plurality of rows, each row representing a code of the plurality of codes of a code set of the plurality of code sets, said plurality of fields comprising a tbl_code field, a tbl_level field, and a tbl_description field, said a tbl_code field specifying the code, said tbl_level field specifying the code level of the code, said tbl_description field including a description of a product or service represented by the code.

2. The method of claim 1, said plurality of fields further comprising a parent linkage field that specifies a link to the parent code of the code if the code is not at the highest code level.

3. The method of claim 2, said plurality of fields further comprising a tbl_srl_no field that specifies a unique serial number of the code, said unique serial number being a primary key of the table, said parent linkage field being a tbl_up_srl_no field such that the link to the parent code is the serial number of the parent code.

4. The method of claim 1, said plurality of fields further comprising a tbl_code_type field specifying the code type of the code set that comprises the code.

5. The method of claim 1, said plurality of fields further comprising a tbl_last_lvl field specifying whether the code is at a lowest code level.

6. The method of claim 1, wherein at least two of said code types differ from each other.

7. The method of claim 1, wherein a code type of said plurality of code types is selected from the group consisting of a Harmonic code type, a NACE code type, and a NAICE/NAFTA code type.

8. The method of claim 1, further comprising adding a new code to a code set of the table.

9. The method of claim 1, further comprising adding a new code set to the table.

10. The method of claim 1, wherein the computing system is comprised by a communication network.

11. The method of claim 10, wherein the communication network includes the internet.

12. The method of claim 1, said software being coded in a computer programming language selected from the group consisting of Java, C, and C++.

13. A computer system comprising a data storage and a processor, said data storage storing a table of codes, said processor adapted to execute software code that reads data from said table stored in said data storage, said table comprising a plurality of code sets, each code set being characterized by a code type, each code set comprising a plurality of codes organized according to a hierarchal structure in which each code is at a code level of the hierarchal structure and either the code level of the code is a highest code level or the code is linked to a parent code, said table having a tabular format characterized by a plurality of fields and a plurality of rows, each row representing a code of the plurality of codes of a code set of the plurality of code sets, said plurality of fields comprising a tbl_code field, a tbl_level field, and a tbl_description field, said a tbl_code field specifying the code, said tbl_level field specifying the code level of the code, said tbl_description field including a description of a product or service represented by the code.

14. The computer system of claim 13, said plurality of fields further comprising a parent linkage field that specifies a link to the parent code of the code if the code is not at the highest code level.

15. The computer system of claim 14, said plurality of fields further comprising a tbl_srl_no field that specifies a unique serial number of the code, said unique serial number being a primary key of the table, said parent linkage field being a tbl_up_srl_no field such that the link to the parent code is the serial number of the parent code.

16. The computer system of claim 13, said plurality of fields further comprising a tbl_code_type field specifying the code type of the code set that comprises the code.

17. The computer system of claim 13, said plurality of fields further comprising a tbl_last_lvl field specifying whether the code is at a lowest code level.

18. The computer system of claim 13, wherein at least two of said code types differ from each other.

19. The computer system of claim 13, wherein a code type of said plurality of code types is selected from the group consisting of a Harmonic code type, a NACE code type, and a NAICE/NAFTA code type.

20. In a computing system consisting of a central processing unit with associated memory, input output devices and data storage means, a method for converting and storing classification data of existing codes having different numbers of levels and different number of digits in each level in their hierarchal structure, comprising converting the said existing codes in an integrated manner to a tabular format, containing the description of existing codes, level of codes and links to the parent codes by a converting means and storing the said tabular format in the said data storage means, such that it is accessible by a common access means.

* * * * *

UNITED STATES PATENT AND TRADEMARK OFFICE
CERTIFICATE OF CORRECTION

PATENT NO. : 6,968,336 B1
DATED : November 22, 2005
INVENTOR(S) : Gupta

It is certified that error appears in the above-identified patent and that said Letters Patent is hereby corrected as shown below:

Title page,
Item [56], References Cited, OTHER PUBLICATIONS,
"TAA/AFTA-TAA General Coding Instructions," reference, delete "no. date" and insert -- no date --.

Column 3,
Lines 32 and 33, delete "if highest of the level code" and insert -- if highest level of the code --.

Column 5,
Delete lines 1 and 2.

Signed and Sealed this

Seventh Day of February, 2006

JON W. DUDAS
*Director of the United States Patent and Trademark Office*